United States Patent [19]

Ware

[11] Patent Number: 5,133,517
[45] Date of Patent: Jul. 28, 1992

[54] ACCESS DOOR PALLET
[75] Inventor: Randolph H. Ware, Boulder, Colo.
[73] Assignee: External Tanks Corporation, Boulder, Colo.
[21] Appl. No.: 285,749
[22] Filed: Dec. 15, 1988
[51] Int. Cl.[5] ............................................... B64G 1/22
[52] U.S. Cl. .............................. 244/158 R; 244/118.2; 244/118.1
[58] Field of Search .............. 244/458 R, 118.1, 118.2, 244/129.4, 129.5, 161, 169; 312/330

[56] References Cited

U.S. PATENT DOCUMENTS

| | | | |
|---|---|---|---|
| 2,442,459 | 6/1948 | Fowler | 244/118.2 |
| 3,144,219 | 8/1964 | Schnitzer | 244/161 |
| 3,151,536 | 10/1964 | Raitt . | |
| 3,231,224 | 1/1966 | Koelle | 244/169 |
| 3,771,749 | 11/1973 | Smialowicz . | |
| 4,106,729 | 8/1978 | Bergman . | |
| 4,116,263 | 9/1978 | Gaussle et al. | 244/158 |
| 4,125,235 | 11/1978 | Fitzgerald et al. . | |
| 4,395,004 | 7/1983 | Gaussle et al. | 244/158 R |
| 4,588,147 | 5/1986 | Lindsey, Jr. | 244/129.4 |
| 4,715,565 | 12/1987 | Wittmann | 244/158 R |
| 4,792,108 | 12/1988 | Ball | 244/158 R |

OTHER PUBLICATIONS

Use of pallet-type structures in shuttle-attached and free-flying modes, McGrath et al. May 1980.

Primary Examiner—Galen Barefoot
Assistant Examiner—Christopher P. Ellis
Attorney, Agent, or Firm—Greenlee and Associates

[57] ABSTRACT

Access door pallets for an external tank of a Shuttle Transportation System are provided. Access door pallets replace one or more access doors on the external tank. In addition to carrying out the original function of the replaced access door, they provide a means for attaching a payload to the external tank. The payload can be mounted on either side of the door. For example, thrusters, maneuvering devices, guidance and attitude control systems can be mounted on the exterior; measuring instruments, chemical release devices, transmitters, extensible solar collectors, and pressurized chambers can be mounted on the interior.

3 Claims, 9 Drawing Sheets

ACCESS DOOR PALLET

FIELD OF THE INVENTION

The invention lies in the field of aerospace devices, specifically with respect to replacement or substitute components of a space shuttle, in particular of those components that function as access doors or hatches for an external fuel tank. An external fuel tank is a device structure which carries liquid fuel for booster rockets intended to carry a space shuttle to about 99% of orbital velocity, where they are detached from the shuttle to enable the shuttle to proceed under self-contained power. An external tank has one or more doors, hatches, manhole covers and the like to provide access to various parts inside the tank structure before launch.

BACKGROUND OF THE INVENTION

The Shuttle Transportation System (STS) "space shuttle" is a combination of several components, the orbiter which somewhat resembles an airplane, the external tank and two solid rocket boosters. The STS is launched by a combination of the space shuttle main engines, fueled by combustion of liquid $O_2$ and liquid $H_2$, and solid rocket boosters, fueled by solid propellant. Fuel for the main engines is carried in the external tank. At launch, both the main engines and the solid rocket boosters are ignited, accelerating the STS to a speed of Mach 1 in 50 seconds. The solid rocket boosters consume their propellant about 2 minutes, 10 seconds, after ignition by which time the STS has reached a speed of Mach 4.5 and an altitude of 28 miles. The solid rocket booster casings separate from the vehicle and are recovered after landing in the ocean via parachute. The orbiter proceeds under power of the main engine to an altitude of about 70 miles, at which point the main engines are cut off. Twenty seconds later the external tank is separated from the orbiter, and the tank remains in space for 30-60 minutes before descending over open ocean, breaking up and burning during re-entry. The orbiter is then powered into orbit by the smaller, on-board orbital maneuvering system engines.

At the point of separation, the external tank contains about 8,000-20,000 lbs. of unused fuel. In addition, the tank includes pressurizable containers, one with a total volume of 53,518 cubic feet, the other with a total volume of 19,563 cubic feet. By comparison, the Skylab had a total volume of about 10,000 cubic feet. That these structures are discarded after being launched to near-orbital velocity is very wasteful. Various options are available for inserting the external tanks into stable orbit, where use can be made of the large pressurizable volumes they provide. These include direct insertion using the STS itself, and providing a dedicated orbital maneuvering vehicle with guidance and attitude control for the external tank. Both options are feasible. As discussed infra, the total payload of the STS launch system can be much greater than presently used because current limitations relate to the maximum allowable on the shuttle orbiter itself. However, additional payload can be carried provided means for carrying the payload elsewhere, e.g., on the external tank, were provided.

The present invention provides such means by substituting one or more of several access doors on the external tank with an access door pallet, having attachment means carrying out the original function of the replaced access door, and having, in addition, mounting means for attaching a payload internally or externally of the tank and containing means for containing the payload in case it is to be internally mounted. Externally mounted payloads could include, for example, thrusters, maneuvering devices, guidance and attitude control systems and the like. Internally mounted payloads could include, for example, measuring instruments, chemical release devices, transmitters, extensible solar collectors, internally pressurized chambers, and the like. Embodiments of the present invention are termed herein access door pallets. Access door pallets in conjunction with the external tank effectively modify the tank's function, converting it into a research vehicle or an orbiting structure in its own right.

An advantage to substituting an access door pallet for an existing access door is that such substitution can be carried out without imposing structural modifications on the tank design, or changing existing tank specifications. Furthermore, if tank specifications change, an access door pallet can be modified and constructed independently of tank construction. An access door pallet can be installed and loaded with payload at or near the launch site. The fact that the access doors are removably attached to the tank and therefore capable of substitution, makes the access doors especially attractive for post-manufacture modification of the external tank.

Modification to doors to perform a second function are known in the art. Hooks, hangars and the like are commonly affixed to doors. Aircraft doors with deployable air-inflated escape slides are disclosed in U.S. Pat. Nos. 3,771,749, 4,106,729 and 4,125,235. Such structures are combined with a door since their function is intrinsic to that of the door. Also of interest is U.S. Pat. No. 3,151,536 disclosing a "pallet" on a hinged camera back. The device combines into one structure two functions related to taking and preserving photos. None of the described devices alter the utility or function of the structure containing the door.

SUMMARY OF THE INVENTION

The invention includes several embodiments, each of which replaces, or substitutes for, the pre-existing hatch or manhole cover of a space shuttle external tank. Function of the tank is altered by incorporating the invention into the external tank, such that the tank is rendered capable of acting as an instrument platform, launch platform, or orbiting structure thereby. Specific functions which can be conveyed by the various embodiments of the invention depend upon the size and location of the hatch or cover being replaced. For example, one embodiment of the invention provides a substitution for the intertank door of an existing external tank with a pallet or container within which scientific instruments can be placed, or from which devices or substances can be ejected. For another embodiment, the existing intertank door can be replaced by a cargo container having up to about 100 cu. ft. of internal volume for containing or storing larger items of apparatus, deployable thrusters, antennae, solar panels and the like. In yet another embodiment, the existing intertank door can be replaced by an airlock having a first and a second airtight door at the front and rear thereof to provide for astronaut access into the interior of the external tank. In yet another embodiment, the aft manhole cover of the hydrogen vessel tank of the existing external tank can be replaced by a hatch-mounted rocket motor for use in boosting the external tank into stable orbit after separation from the shuttle. All such embodiments provide new functions for the external tank in addition to the tank's normal function thereby enhancing its value and range of uses. All such uses are rendered possible by the realization that the weight-carrying capacity of the orbiter is limited by emergency landing requirements and not by the weight-carrying capacity of the Space Transportation System. Up to 10,000 lbs. additional weight can be carried by the STS under current launch specifications if means for mounting or containing such cargo elsewhere than in the orbiter were provided. The present invention provides such means.

BRIEF DESCRIPTION OF THE FIGURES

FIG. 2 is a perspective view of the intertank (3). The intertank (3) functions as a connecting segment between the $O_2$ and $H_2$ tanks and also as a connecting point for the solid rocket boosters used during the first phase of launch. A large box beam (4) extends from one side of the intertank (3) to the other, ending in a solid rocket booster fitting (5) at either end of beam (4). Structural strength for the intertank is provided by annular ring frames (6) and longitudinal stringers (7). The intertank door (8) is a hatch used for access to the intertank region prior to launch.

FIG. 3 is a perspective view of the intertank door (8). The door (8) is not hinged, but completely removed when access is desired. During flight, the door (8) is secured by a series of bolts (9). A seal (10) cushions the door to reduce vibration during flight. Although the door is therefore sealed, it is not necessarily pressure-tight since the space within the intertank (3) is vented to the exterior and typically flushed with pure $N_2$ prior to launch. The door (8) is 42"×48" and mounted by 42 mounting bolts (9).

DETAILED DESCRIPTION OF THE INVENTION

Definitions

Pallet: Various names are used for the type of closures that seal the connecting ports between internal and external regions of an external tank. These include, for example, "door," "manhole cover" and the like. In the aerospace industry, the term "pallet" is understood to refer to any structure which can serve for mounting instruments or other apparatus. The devices of the present invention are termed "pallets" herein, with a further modifier that indicates the particular door, hatch or manhole cover it is meant to replace. An "intertank door pallet" is a device of the invention designed to be mounted on an external tank in place of an existing intertank door. Similarly an "aft manhole cover pallet" is a device of the invention designed to be mounted in place of an aft manhole cover. The terms "access door" and "access opening" are generic to the various doors and manhole covers found on or in an external tank, and to the various openings covered by access doors. "Operational closure" of an access opening means that the door or pallet serves its intended function. For example, manhole covers on the fuel tank must meet pressure and sealing specifications, while an intertank door need only be securely fastened, sufficient to withstand vibrations, buckling forces and other stresses associated with the STS launch process.

Shuttle Transportation System—(STS) is the name used to refer to the combination of orbiter, external tank and solid rocket boosters.

Orbiter is the term used for that component of the STS which is manned, which orbits the earth and which re-enters the earth's atmosphere and lands unassisted. The orbiter has stubby wings, resembles an airplane and is the component most commonly associated with the term "space shuttle."

External tank—At present, the design of an external tank used in connection with the STS has been standardized to allow for the construction of dozens of such tanks for routine launches. Much of the detailed description of the invention is expressed in terms of the current design.

The external tank in current use is 153.8 ft. long and 27.6 ft. in diameter. It weights about 69,000 lbs. empty and 1,660,000 lbs. when loaded with propellant at launch. The external tank has three components, a liquid oxygen tank, a liquid hydrogen tank and an intertank which connects the two propellant tanks, houses needed instrumentation and provides attachment points for two solid rocket boosters. It will be understood that the invention is adaptable for embodiments intended to fit other external tank designs and also for such other structures as may in the future be designed for separation from the main payload of a rocket launch.

The choice of which embodiment to use is governed in part by the size of the intended payload and the preferred payload location. Each type of pallet will have preferred uses as understood in the art. It will also be understood that more than one pallet can be mounted in a single external tank.

Figure 4:
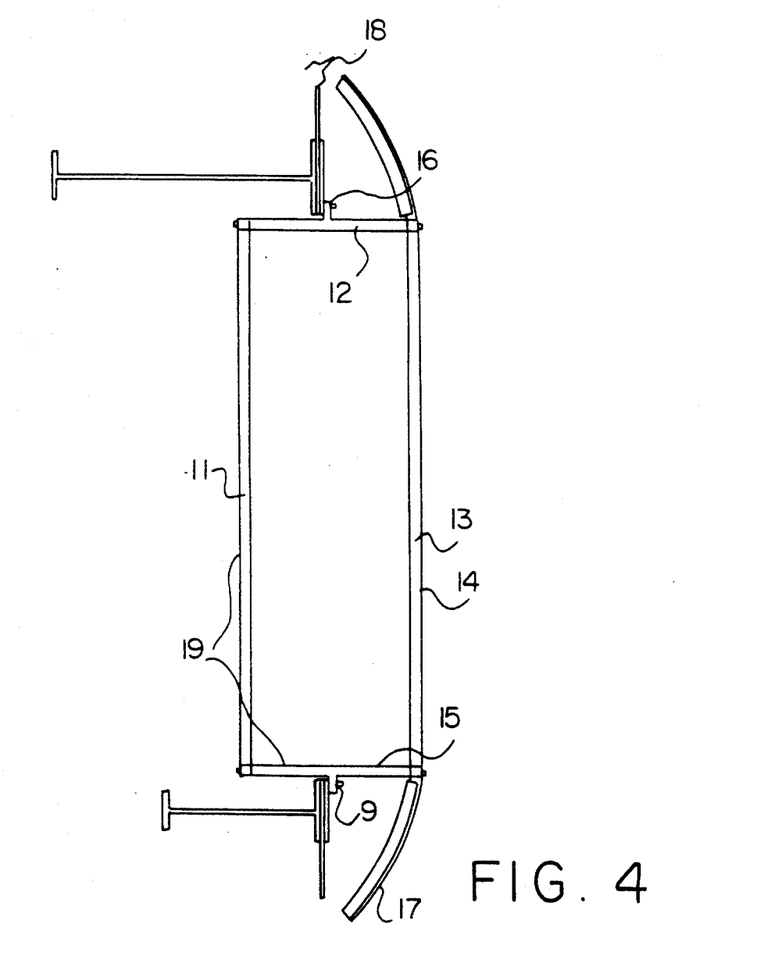
FIG. 4 is a cross-sectional view of a wall-mounted embodiment of the intertank door pallet, mounted on the intertank (3) of FIG. 3 in place of the intertank door (8). The pallet is in the shape of a box with a bottom (11), side walls (12) and top (13) having the same outer dimensions as the door (8) but having greater depth such that when mounted in place of door (8) the pallet protrudes externally and internally from the surface of the intertank. The "bottom," "top" and "sides" are arbitrarily designated as if the pallet were a box and the external tank were lying on its side with the intertank door uppermost. The pallet has interior depth of about 12 inches and interior length and with slightly smaller than the intertank door opening due to the thickness of side wall (12).

Turning first to the wall-mounted intertank door pallet shown in FIG. 4, it will be apparent that the pallet will be used for small, and relatively light (up to about 100 lb.) payloads. Structural strength of the walls must be adequate to meet NASA fracture control specifications. In particular, the box must be sufficiently impact-resistant to contain the payload or payload parts should they break loose from their mountings during launch or flight. Bottom (11) wide walls (12), and top (13) are constructed shell of 0.75" thickness aluminum honeycomb sandwich (14) providing both sufficient impact strength and requisite structural rigidity. The smaller side panels (12) can be constructed of aluminum isogrid, shown at 15. A flange (16) extending from the side walls (12) and around the perimeter thereof, approximately midway between the top and bottom is drilled with holes corresponding to the pre-existing intertank door bolts (19). A fairing (17) extending in a smooth curve from the top (13) to the outer surface of the intertank (18) streamlines airflow over the external tank surface during launch. The aerodynamic shock wave extending from the frontal surfaces of the external tank flares outward from the tank such that it is several feet above the tank surface at the level of the intertank door pallet. Consequently, a surface bulge at that location does not adversely affect the aerodynamics of the shuttle.

Access to the interior of the wall-mounted intertank door pallet can be achieved by providing means (not shown) for removal of top panel 13. Top panel 13 will embody various means for closure and automatic reopening, depending upon the nature of the payload. If the payload is to be deployed, or ejected from the pallet, means for reopening top panel 13, together with means for timing and energizing the reopening process can be constructed in the form of hinged or sliding panels, shutters, or a series of portals. Solar panels can be incorporated into such structures to provide energy for devices carried in the pallet (see FIG. 8).

Payload mounting positions can be provided by pre-fabricated 0.75" solid aluminum inserts (19) in the honeycomb sandwich The inserts are inserted in a regular grid array, e.g., on 4" centers, drilled and tapped according to aerospace industry standard dimensions. Such mounting points provide a convenient means for mounting almost any payload within the pallet. It will be understood that certain payload structures will require custom-fabricated mountings.

There are several devices which could be usefully sent aloft in a wall-mounted intertank door pallet. A combined accelerometer and attitude sensing instrument package mounted on an intertank door pallet allows the attitude and deceleration of the external tank to be measured during its 8,000 mile down-range trajectory through the thermosphere (that part of the atmosphere from roughly 50 to 300 miles altitude). The thermosphere is dynamically dependent on solar activity in an unpredictable way. Better data and modeling of the thermosphere density fluctuations are of great interest to both civilian and military space programs. For example, the Skylab deorbited earlier than predicted because of inaccurate thermosphere density models. Similarly, the Long Duration Exposure Facility is descending earlier than expected. Thermosphere density data are therefore of considerable value in predicting satellite behavior. The instrumentation for such measurements can be mounted within the wall-mounted embodiment of the intertank door pallet. The data obtained from the instruments can be transmitted to a ground-based tracking monitor via an externally-mounted antenna.

Another type of scientific use for the wall-mounted intertank door pallet is for chemical release and radiation effects measurements. A Chemical Release and Radiation Effects Satellite (CRRES) was developed for launch on the shuttle, and designed to inject various chemicals into space. Observations of plasma physics and radiation effects resulting from the presence of these chemicals in space could be carried out from the ground, from aircraft or from the orbiter However, the CRRES was removed from the shuttle manifest after the Challenger disaster. Alternatives for carrying out such measurements involve a separate launch, for example, using an Atlas-Centaur rocket or a Scout rocket. The CRRES contain a number of independent payload, each weighing about 50 to 80 lbs. which could as well be carried in a wall-mounted intertank door pallet. The pallet in such case is constructed with an opening port in the top (13) to accommodate the nozzle of a chemical release canister.

Figure 5:
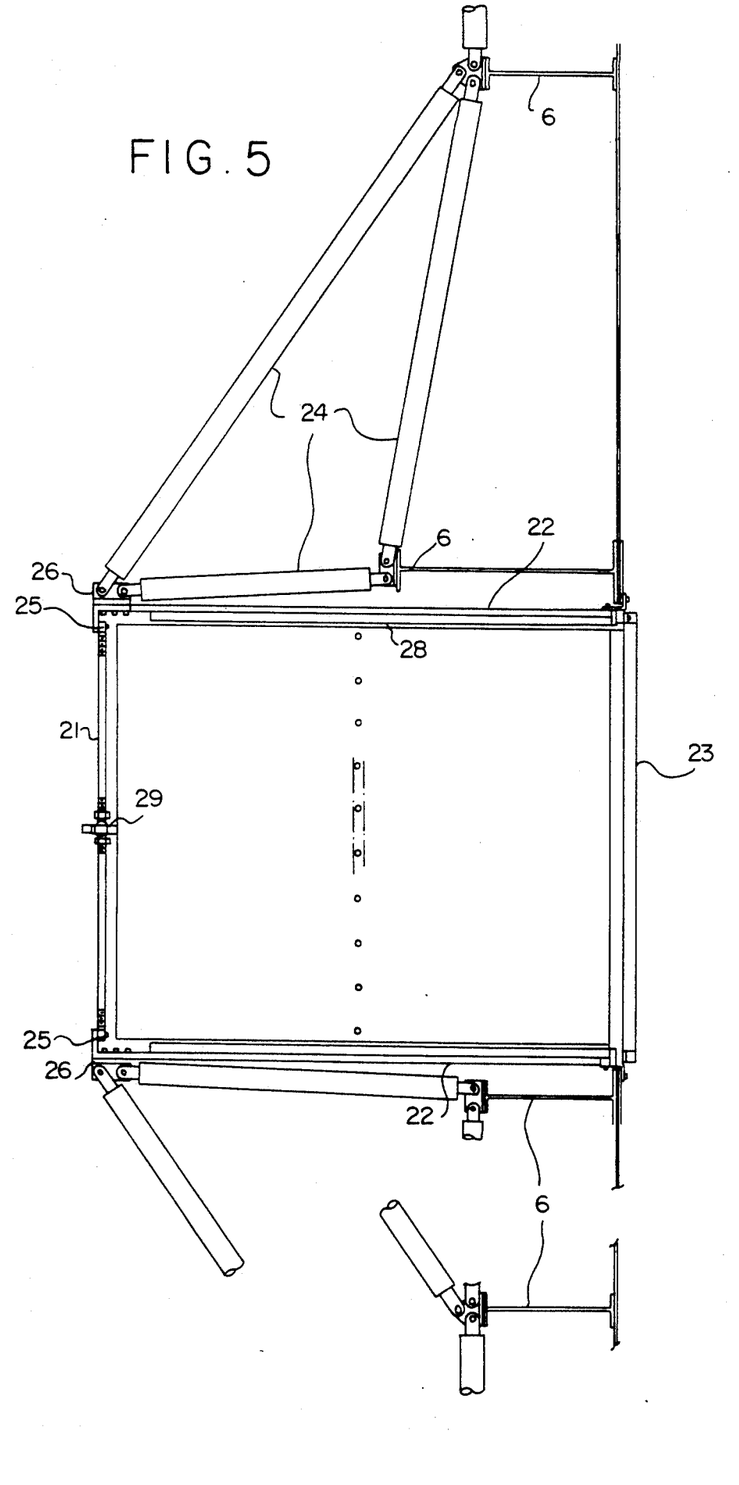
FIG. 5 is a cross-sectional view of a flush-mounted intertank door pallet having a bottom (21), sidewalls (22) and top (23) and mounting struts (24) extending to existing ring frames (6) of the intertank.

Turning next to the flush-mounted intertank door pallet, FIG. 5, it can be seen that the structure incorporates means for carrying larger volume and heavier weight payloads than the wall-mounted pallet. The bottom (21), sides (22) and top (23) are constructed according to NASA fracture containment standards, for example using 0.75" aluminum honeycomb sandwiched between 0.032" aluminum face sheets The top (23) simultaneously forms a closure for the payload envelope and replaces the existing intertank door and is mounted by means of existing mounting bolts (9). The bottom (21) is removably mounted by means of mounting bolts (25) to allow access to the interior of the intertank if needed. The depth (from top to bottom) of the flush-mounted pallet is not limited by availability of support points inside the intertank and could, in principle, extend to the main box beam (4). In FIG. 5, a pallet of 46" depth is shown as this size provides a useful dimension for several types of payloads. The pallet includes support means for transferring the load of the pallet structure and contents between the pallet and load-bearing structures within the intertank. A mounting flange (26) is provided at the corner formed by side (22) and bottom (21) panels for attaching such support means in the form of support rods (24). Support rods (24) are variously sized and extend from mounting flange (26) to load-bearing structures such as intermediate ring frame members (6) or main ring frame member (27). The support rods (24) are preferably constructed with threaded rod ends to facilitate attachment and tightening after mounting. Within the payload envelope, various mounting points, guide rails, support pins and the like can be provided as deemed necessary to provide secure mountings for payload components. Shown in FIG. 5 are sidewall guide rails (28), and a payload support pin (29). Not shown are extensible rails by which a payload may be deployed externally to the tank or ejected therefrom after separation from the shuttle. Such structure will be employed, for example, if the payload includes a rocket motor for attitude and orbit control.

As described with the wall-mounted intertank door pallet, there are a variety of door designs and door opening devices available in the art as part of the means for deploying a payload, should deployment be desired. Telescoping support rod and guide rails can serve to deploy the payload to a mounted position external to the tank surface. Spring devices and ejection charges can be used to eject a payload from the pallet. For example, a small satellite with its own rocket booster could be injected into earth orbit after being carried aloft in the flush-mounted intertank door pallet and ejected therefrom at the appropriate time after separation of the external tank from the shuttle.

Tether experiments can be deployed from the external tank. Such experiments have been designed for deployment from the orbiter. However, safety considerations present major problems for the initial tether experiments, as posing an unacceptable risk. If tethers were deployed from a flush-mounted intertank door pallet after the external tank is jettisoned, this problem could be eliminated. A prototype microprocessor-controlled apparatus has been designed under NASA sponsorship which will allow tether deployment tests. The apparatus is slightly larger than a basketball, weighs 10 kg, contains 20 km of tether, and will deploy a 50-kg mass or dummy payload onto a reentry trajectory. An initial test of this system could be carried out during the one hour an external tank remains in space during a direct insertion launch. Later applications of this technique could see payloads boosted via tether from suborbital external tank trajectories into orbit, and tether deployment of low altitude probes from orbiting spacecraft.

Figure 7:
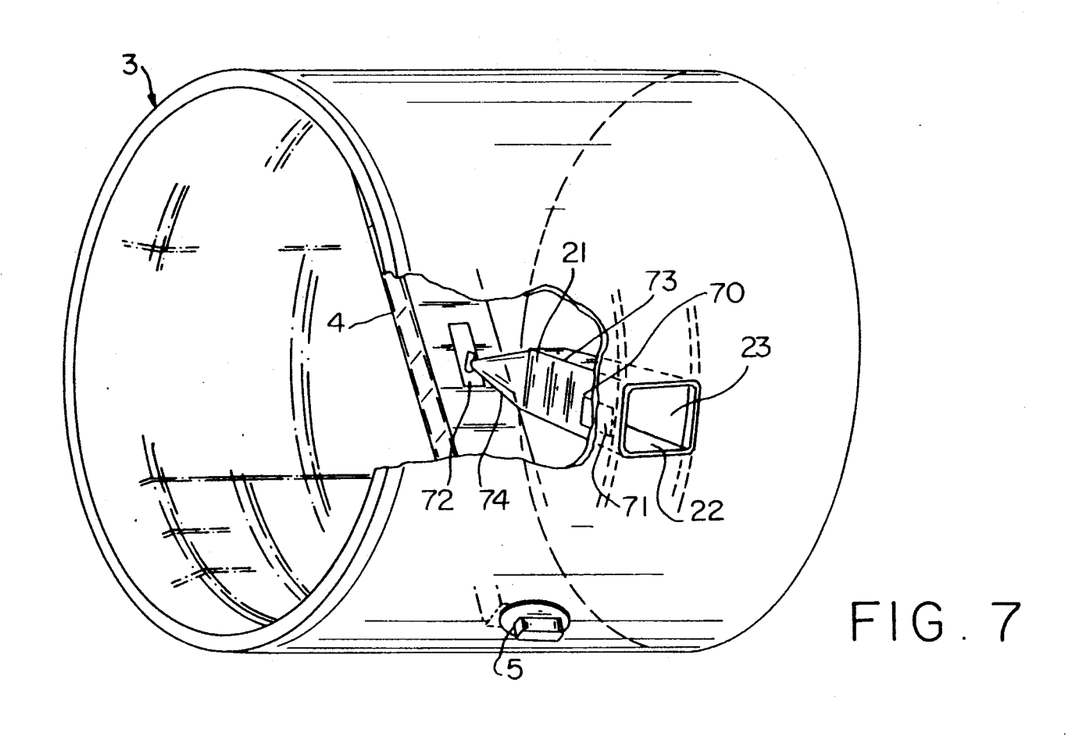
FIG. 7 is a cutaway perspective view of the intertank (3) showing a large flush-mounted intertank door pallet connected to the box beam (4).

Even larger payloads can be carried in a flush-mounted intertank door pallet by increasing the depth of the pallet shown in FIG. 5. Up to about twice the volume can be obtained, however, additional support bracing is required, Conveniently, the inner end (bottom) of the pallet is supported by braces attached to the large box beam (see FIGS. 7 and 8). A door in the side is then provided to permit access to the intertank space. Larger sized pallets of the type shown in FIG. 7 are most conveniently installed during assembly of the intertank rather than at the launch site. However, payload installation can still be accomplished at the launch site. Such larger-sized pallets optionally include one or more internal partitions or bulkheads to aid in fracture control and to facilitate packaging multicomponent payloads. A two-component payload, for example, can include an instrument package contained in an internal (bottom) compartment and an external (top) compartment for an externally deployable solar array and antenna mast to supply power and transmit to ground or satellite receivers (FIG. 8).

Figure 1:
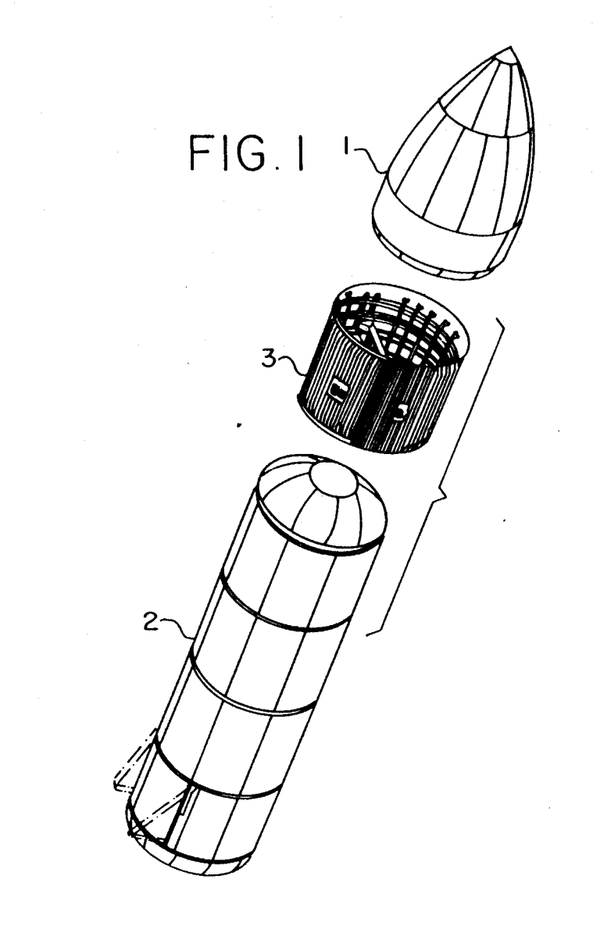
FIG. 1 is an exploded perspective view of the external tank as currently used for space shuttle launches. The external tank has three main components, the liquid $O_2$ tank (1), the liquid $H_2$ tank (2) and the intertank (3). The intertank (3) has a length of 22.5 ft. and a diameter of 27.5 ft.
Figure 2:
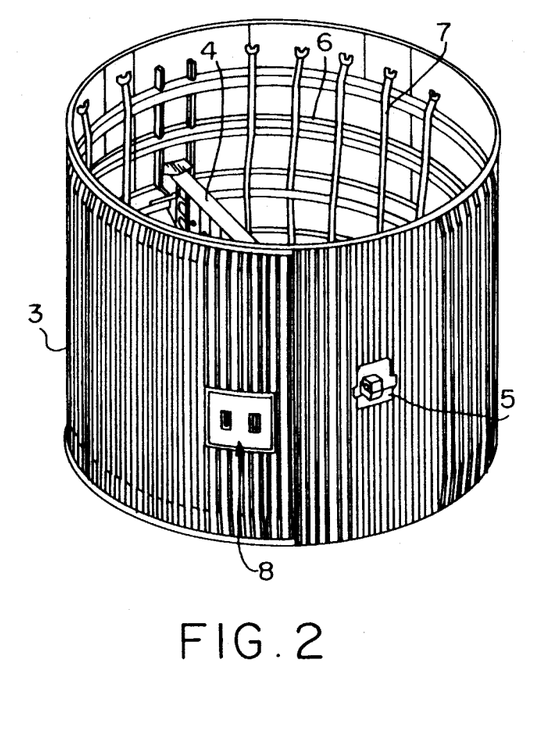
Figure 3:
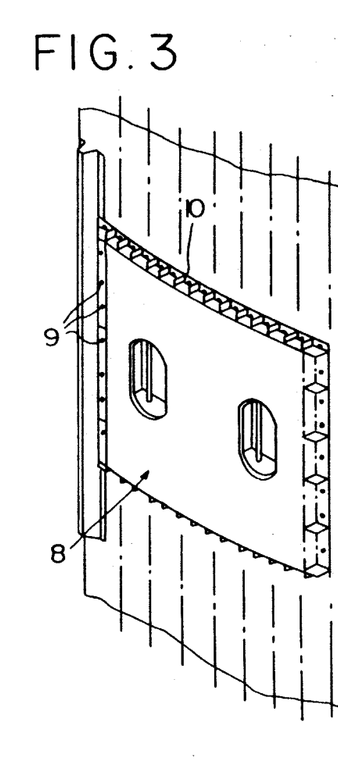

Turning to FIG. 7, a cutaway perspective view of the intertank (3) as viewed from the top is seen. The aft end with H₂ tank is to the left, the fore end with O₂ tank to the right. The cutaway portion displays the box beam (4) in the intertank interior and the large intertank door pallet braced to the box beam (4) by attachment braces (74). The top (23) of the pallet corresponds to the exterior intertank door ((8) in FIG. 3), which the pallet replaces. The bottom (21) and sides (22) of the pallet are constructed essentially as described for the smaller flush mounted intertank door pallet depicted in FIG. 5. Support means are provided for transferring the load of the pallet structure and its contents between the pallet and load-bearing structures within the intertank. Thus, means for bracing portions of the pallet to intertank ring frames ((6) in FIG. 5) are used to support the upper section of the pallet, essentially as shown in FIG. 5. The lower section of the pallet is held firmly in place by the attachment braces (74) angled to attach at a single mounting plate (72) bolted or welded to the box beam (4). Other configurations of the attachment braces (74) with a plurality of attachment points to the box beam (4) are design equivalents accessible to those of ordinary skill in the art. The large pallet includes a door (71) in one of the side walls (70). Door 71 allows launch crew access to the intertank's interior for purposes of inspection, arming the range safety device, and the like. The large pallet is also depicted with an optional bulkhead (73) dividing the interior of the pallet into two compartments. Bulkhead 73 serves several useful purposes. When the payload has separable components, bulkhead 73 provides improved fracture control. In the event one part of the payload breaks loose from its mountings, the remainder of the payload is protected from damage by flying debris. Also, bulkhead 73 allows positioning of additional mounting points for securing payload components within the pallet. It will be appreciated that other variations can be constructed for specific payloads, including partial bulkheads, interior cross-beams and the like. The overall orthogonal shape of the pallet as depicted in FIG. 7 can be modified, as well. In particular, a cylindrical shape with a hemispherical end is preferred if the pallet is to be pressurized. A door (not shown) having a circular or elliptical aperture can then be provided for the rectangular opening in the external tank.

Figure 8:
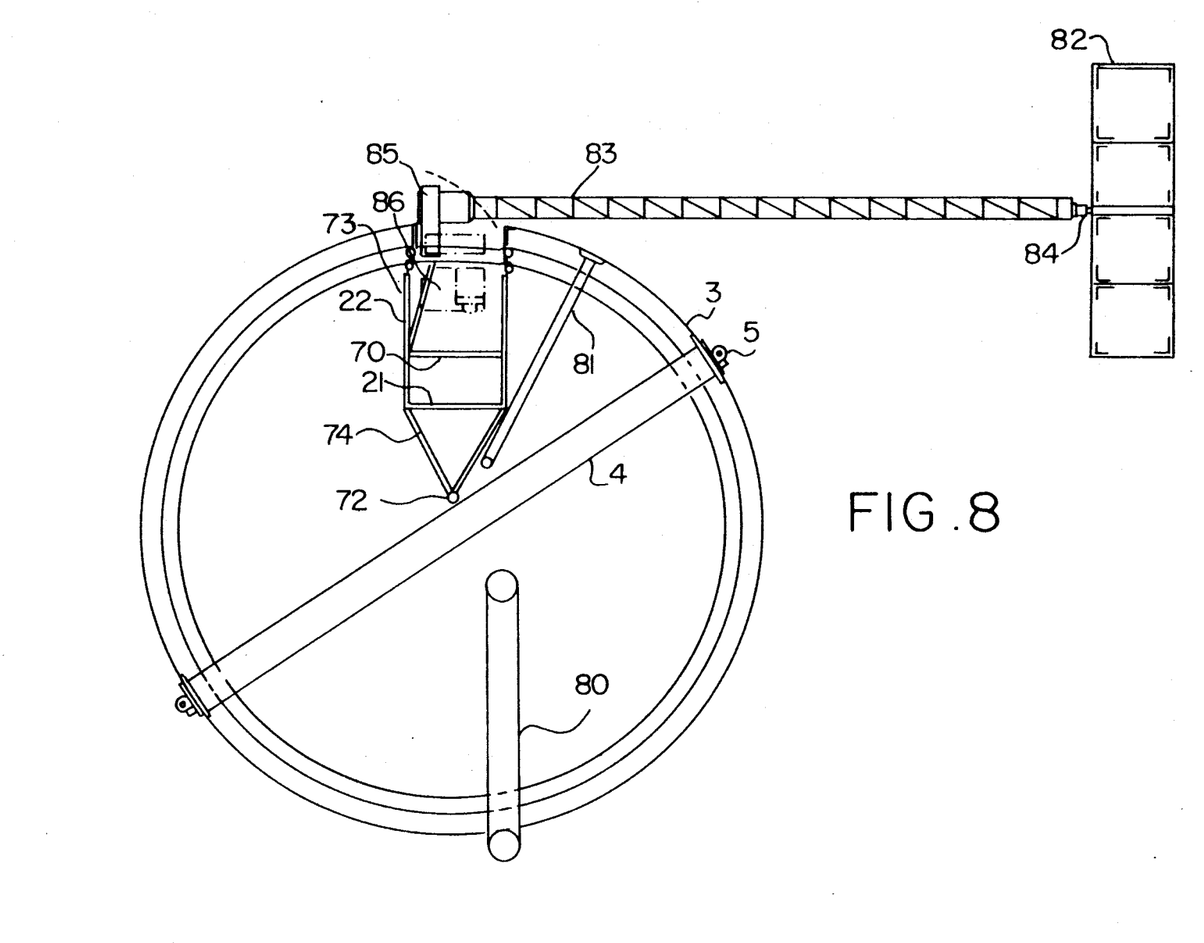
FIG. 8 is a cross-sectional view of the intertank (3) containing a pallet, taken at the level of the box beam (4) and parallel thereto. A pallet is depicted carrying a solar panel array (30) in deployed configuration (solid lines) and payload configuration (dashed lines).

Turning to FIG. 8, the position of the large pallet in relation to other structures within the intertank is shown. The pallet is also shown with a payload of an extensible solar panel array in the top compartment. The payload is shown as deployed and also outlined in folded configuration. The intertank (3) is shown in a cross-sectional view through the box beam (4) at the level of the mounting plate (72). A main liquid O₂ line (80) from the O₂ tank is shown in its conventional position, as is the vent line (81) which allows the interior of the intertank to remain in pressure equilibrium with the external environment. The cross-sectional view shows the pallet bottom (21), two sides (22), internal bulkhead (70) and box beam attachment braces (24). The deployed payload is illustrated to exemplify one type of payload which can be carried in the pallet. The payload is a foldable solar array (82) mounted on an extensible mast (83) by means of a single-axis gimbel (84) which allows the solar panels to orient so as to maximize solar energy collection. The extensible mast (83) is connected to housing (85) which serves both as a container for the mast when collapsed and as a hinged base for connecting the solar collector to the pallet such that the folded solar collector and mast can be swung inwardly to be stowed within the pallet as outlined (dashed lines 86). Various means are known in the art for deployment, for example, by using spring-loading means connected to the extensible components and held in place when stowed by the pallet top, not shown in FIG. 8. The top can be removed by conventional means such as timed or remotely activated pyrolysis of the top mounting bolts. When the top is removed, the payload is deployed by spontaneous extensions of the spring-loaded components. Other devices, as known in the art, may be employed for removing the top, ejecting, deploying and activating the payload, and carrying out such other functions as required for operation as required for each payload. When the pallet houses a payload intended for ejection, ejection spring guide rails or other art-recognized devices can be provided, as desired.

Figure 6:
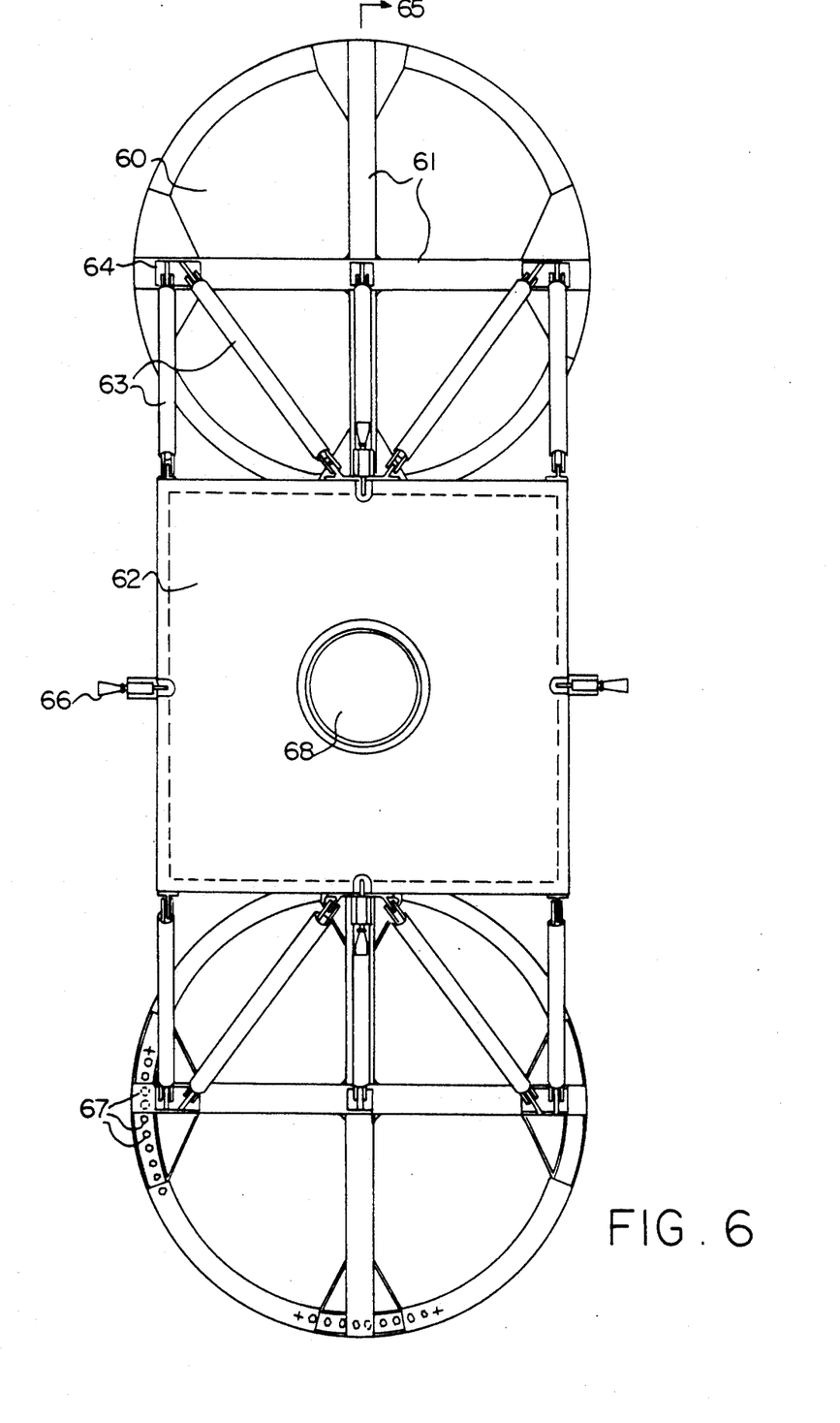
FIG. 6 is a plan view of part of an aft manhole cover pallet, showing mounting means for attaching a pallet on each manhole cover.

Turning next to FIG. 6, an aft manhole cover pallet. It will be seen that devices such as small rocket motors can be mounted thereon. The two aft manhole covers can provide mounting points for a scaffold or framework upon which a number of devices can be mounted. The aft manhole cover pallet will be a preferred mounting platform for devices whose function is best carried out from a position at the aft end of the external tank. Since the aft manhole covers lead directly to the interior of the hydrogen tank, they cannot be opened once the tank is filled. However, by providing increased structural rigidity and mounting points, bolt-on components can be mounted over or between the manhole covers at the launch site after the $H_2$ tank is filled. The aft manhole cover pallet is an especially advantageous mounting platform for an auxiliary propulsion system, since it is situated directly on the long axis of the center of mass. In this configuration, the major thrust vector component coincides with the long axis of the tank, passing through its center of mass such that most of the thrust energy is used for propulsion rather than attitude control. Prefabricated rocket motors, such as the star 26B, manufactured by Thiokol Corp. can be mounted on an aft manhole cover pallet.

By referring to FIG. 6, mounting means for attaching the aft manhole cover pallet to the aft manhole covers can be seen. The existing aft manhole covers (60) are reinforced by the addition of mounting braces (61) which spread the load over the entirety of each manhole cover. The mounting braces (61) are bolted to the aft manhole covers (60) using existing mounting bolts (67) for holding the aft manhole cover (60) in place. The mounting braces (61) are designed to be bolted onto the manhole covers at the time when the manhole covers are finally secured prior to filling the $H_2$ tank. The pallet container (62) is depicted herein as a generally rectilinear box although any shape appropriate to the intended payload and its function can be employed. The pallet container (62) is connected to the mounting frame (61) at each manhole cover by sets of adjustable mounting braces (63) which bolt to mounting lugs (64) bolted to the pallet and to the mounting frame at desired points. The mounting braces (63) have threaded ends to permit turnbuckle type length adjustment. The combination of mounting braces forms a truss, with members extending from both upper and lower edges of the pallet container to the mounting lugs (64). In the center of the pallet container (62) is an opening through which extends the cone of the main thruster (68), sometimes termed the "$\Delta V$ thruster," since its purpose is to accelerate the tank in a linear direction. Smaller attitude control thrusters (66) are positioned at outer edges of the pallet. Attitude control in all three axes can be improved by positioning additional thrusters forward on the external tank (not shown) as will be understood in the art.

Figure 9:
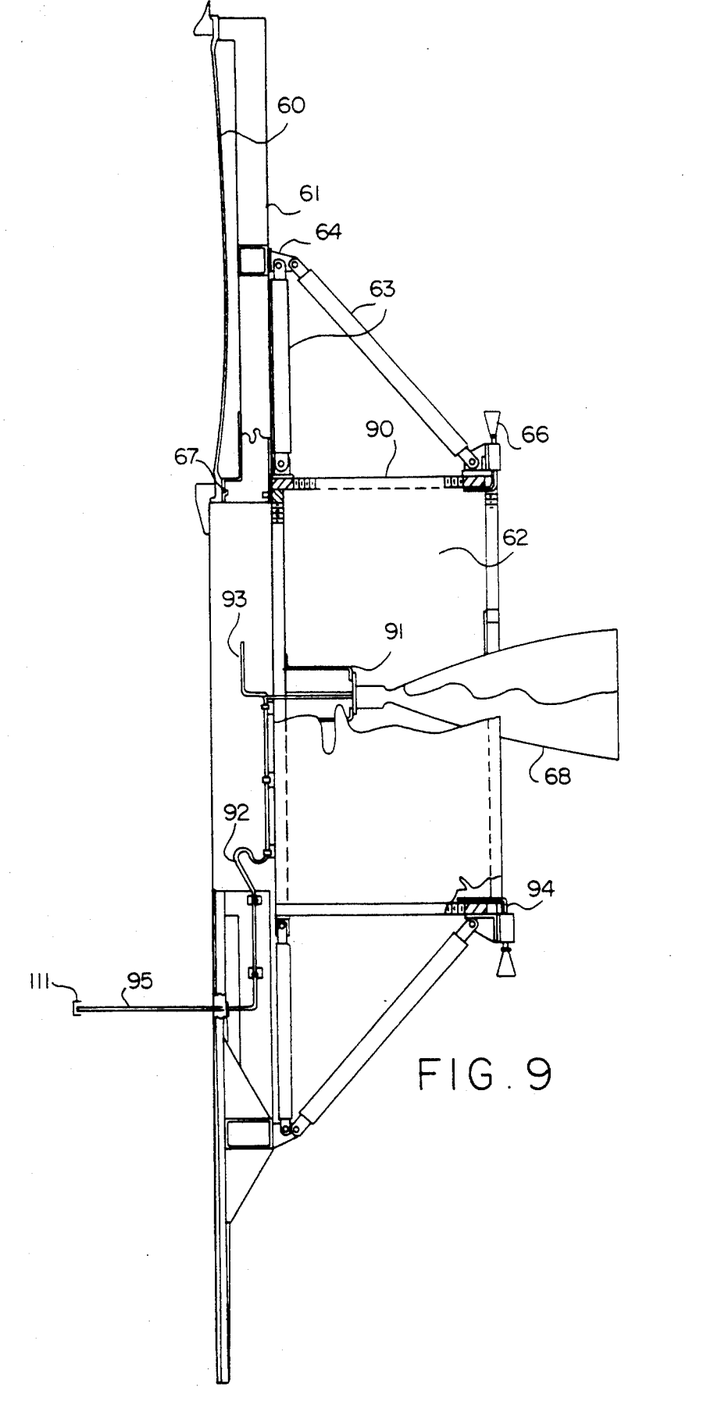
FIG. 9 is a cross-sectional view of about two-thirds of an aft manhole cover pallet through the plane of (65) marked in FIG. 6. The pallet is symmetrical such that the mounting shown on one of the aft manhole covers is mirrored by the mounting, not shown, on the other.

Further details of aft manhole cover pallet design are shown in FIG. 9, a longitudinal cross-section along line 65. The mounting frame (61) members are shown as rectangular aluminum tube bolted in place by existing bolts (67). Mounting frame (61) is slightly raised above the surface of manhole cover (60) to permit the frame (61) to clear any curvature or raised elements on the manhole cover (60) surface. A portion of the truss formed by adjustable mounting braces (63) extending parallel to the manhole cover (60) and also diagonally outward from mounting adapter (61) to an outer corner of pallet container 62.

Pallet container 62 is shown constructed of 1.00 inch aluminum honeycomb sandwich (90) which provides both fracture control and heat insulation. The aft region of the external tank is subjected to heat stress during launch of the STS, even though the main engine and solid rocket booster exhausts are positioned 20–35 feet aft of the external tank aft manhole covers. Additional insulation in the form of polymer foams, for example, can be added internally if needed. A motor (91) for accelerating the external tank to orbital velocity is contained within the pallet container (62). The cone (68) of the motor, also termed the main thruster or $\Delta V$ thruster, extends outwardly from the aft end of the pallet container (62). The main thruster (68) can be powered by self-contained propellent or by tapping unexpended fuel in the external tank. In the latter case, the thruster can be a simple inertial thruster, ejecting pressurized $H_2$ from the $H_2$ tank. Such a thruster is not complex, is lightweight and relatively simple to add to the tank as a retrofit.

An $H_2$ feedline (92) is shown. The $H_2$ feedline (92) extends from the $H_2$ tank to the main thruster. The feedline (92) enters the $H_2$ tank through a fitting in an aft manhole cover (60) and terminating in a lance (95) extending into the tank at least 12 inches. When the tank is separated from the orbiter, the unexpended fuel consists of both liquid and gaseous $H_2$, the former most likely dispersed in globules and droplets throughout the interior of the $H_2$ tank, given the nearly weightless conditions at the time of separation. A baffle (111) at the lance tip can act to prevent liquid $H_2$ droplets from entering the $H_2$ feedline (92). Once the main thruster (68) is activated, acceleration causes the liquid $H_2$ to coalesce in a continuous mass at the aft end of the tank. Lance (95) extends a sufficient distance into the $H_2$ tank that its opening will be above the level of coalesced liquid $H_2$. Use of lance 95 through the aft manhole cover entails replacing the existing manhole cover with a modified cover (in effect, an access door pallet) having the lance (95) installed and having means for coupling (112) the lance (95) to the line (92). The modified manhole cover pallet is installed prior to filling the $H_2$ tank.

The main thruster can also operate as a combustion engine, burning $H_2$ with $O_2$ derived from the unused $O_2$ of the $O_2$ tank. An $O_2$ line (93) is shown in part, leading to the main thruster (91). The $O_2$ line (93) extends forward to tap into the $O_2$ tank or $O_2$ line of the main engine. Use of an $O_2$ line will then entail its installation on the external tank during manufacture.

In addition to the main thruster (91), two attitude control thrusters (66) are shown, together with a portion of a fuel line (94) for delivering fuel to each thruster individually.

Fuel to the main and attitude thrusters can be metered as needed to each thruster to control velocity and attitude as desired, using devices known in the art (not depicted herein). Electronic controls, attitude sensors, on-board computers and the like as required for controlling the main and attitude thrusters can be housed in the pallet (62), rendering it a self-contained propulsion unit for the external tank.

The aft manhole cover pallet can be mounted on the aft manhole covers of either the H₂ or the O₂ tank, since the manhole configuration is similar for each tank. Mounted on the H₂ tank, the pallet containing a thruster can maneuver the entire external tank. However, the O₂ tank alone can be maneuvered by thrusters, provided means are provided for separating the O₂ tank, or O₂ tank plus intertank, from the H₂ tank at the desired time.

Figure 10:
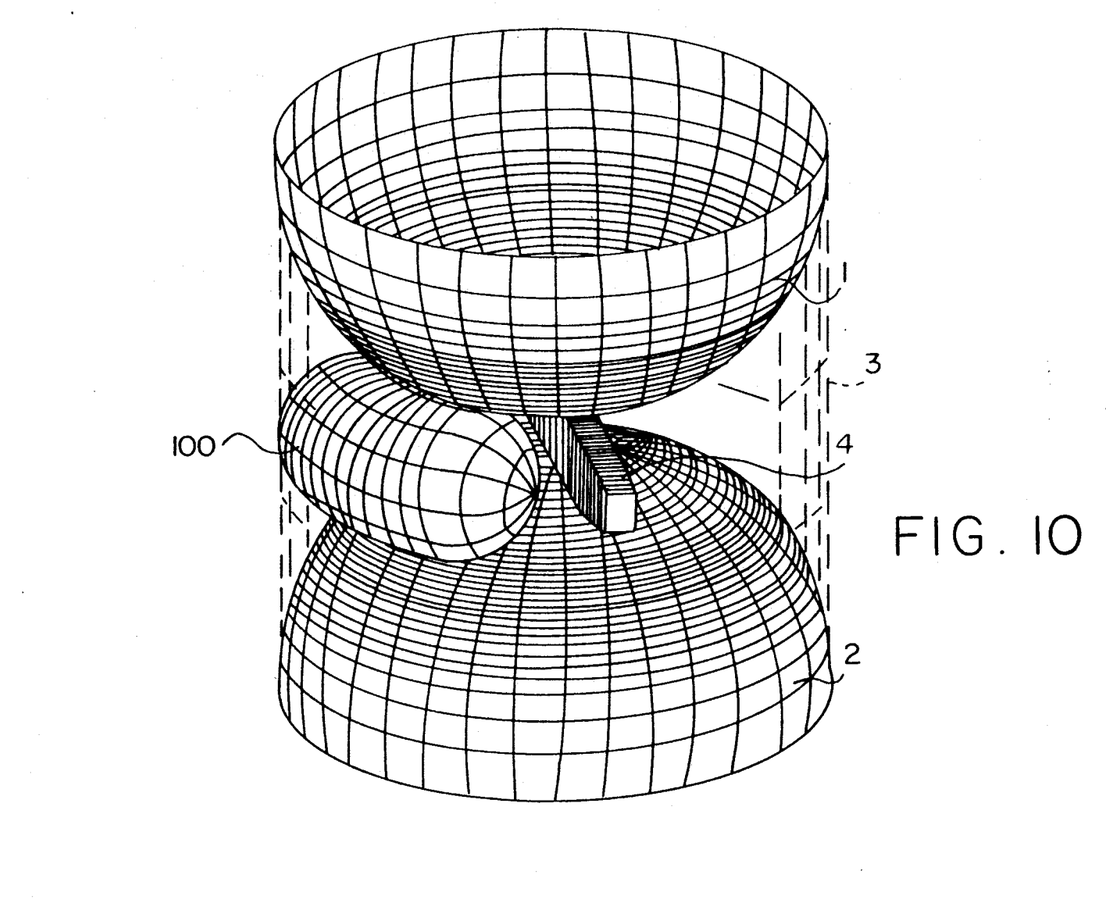
FIG. 10 is a perspective diagram of intertank space containing a pressurizable habitat of toro-cylindrical form, mounted within the intertank. The liquid $O_2$ tank and liquid $H_2$ tank are shown respectively above and below the toro-cylindrical habitat.

FIG. 10 shows a segment of the external tank including the intertank region and the aft and forward ends of the O₂ (1) and H₂ (2) tanks, respectively. The intertank shell (3) is cut away to reveal internal structures, the box beam (4) and a pressurizable chamber (100) in torocylindrical form. The pressurizable chamber (100) can be constructed of an aluminum shell 0.025 inch thickness, giving a static empty weight of about 287 pounds. As shown, curvature of the chamber (100) extends through 150° of arc and encloses approximately 1,300 cubic feet of space. The chamber (100) can be pressurized sufficiently to provide a "shirtsleeve" working environment inside. Means for temperature control, air renewal, food, water, waste disposal and other requirements must be provided according to known expedients in the art of manned space environments. The extent and complexity of such life-support means will be greatly affected by the contemplated duration of any occupancy of the chamber. For example, for the purpose of maintaining robotic equipment operating in a near-zero gravity, atmospheric pressure environment, the need for such means will be minimized.

Entry into the pressurizable chamber (100) will be via an intertank door pallet adapted on the exterior for docking a vehicle as it performs a rendezvous with the external tank, and on the inside for forming an airlock through which an astronaut can emerge from the docking vehicle and enter the chamber (100) without loss of internal pressure in either vehicle. For example, if the docking vehicle is pressurized, sealing means whereby the docking vehicle is sealed to the outer surface of the intertank door pallet allows the exit hatch of the vehicle to be opened directly to the pallet door and thence into the pressurized chamber (100) without significant loss of air from either. The sealing means form a pressuretight air seal able to contain up to 1 atmosphere air pressure.

The pressurized chamber (100) also has a door opening to the unpressurized intertank space to allow access thereto prior to launch. Another hatch providing passage from the chamber (100) to the O₂ tank (1) can also be provided. Once excess O₂ is removed from the O₂ tank, the space therein can be rendered habitable. Thus, the pressurized chamber (100) provides means for accessing the internal volume of the O₂ tank (1). In principle the even larger volume of the H₂ tank could be accessed as well. However, under current external tank design, the front manhole covers through which such access could occur are not placed to allow direct access from the chamber (100). Modification to allow direct access would be required, either through redesign of the H₂ tank or by constructing a pressurized tube extending from the chamber (100) to the nearest H₂ tank manhole cover.

Mounting the pressurizable chamber (100) within the intertank can be accomplished by means previously described for the flush-mounted intertank door pallet (FIG. 5) and for the large intertank door pallet (FIGS. 7 and 8). Such means include, but are not limited to, support rods extending from mounting flanges on the chamber (100) surface to ring frame members, and attachment braces connected to mounting points on the box beam (4). Preferably, the chamber will be reinforced with stiffening members to resist buckling loads during launch. The chamber should be mounted so as to maintain dynamic clearance with respect to existing structures within the intertank, as will be understood in the art.

Figure 11:
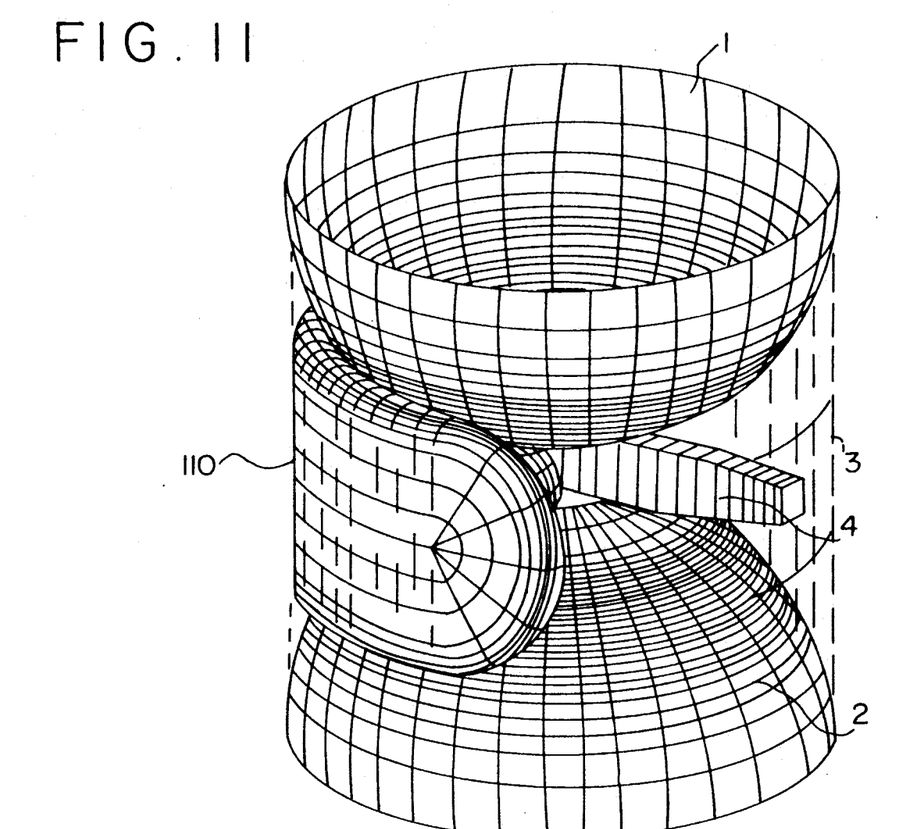
FIG. 11 is a perspective diagram of intertank space containing a pressurizable habitat of oblique toroid form, mounted within the intertank. The liquid $O_2$ tank and liquid $H_2$ tank are shown, respectively, above and below the oblique toroid habitat.

FIG. 11 shows a view similar to FIG. 10 containing a pressurizable chamber (110) in oblique toroid form. The oblique toroid chamber (110) extends through about 150° of arc and includes a pressurizable volume of about 2,300 cubic feet. Although a larger volume is available in the chamber (110), than in chamber 100, the increased surface area is proportionately even greater, increasing the temperature control problems and adding substantially to overall weight. Other considerations with respect to design and use will be essentially as described for chamber 100. Both chambers are too large to be added as retrofits and must be added to the intertank during construction. An essential feature of both chambers involves the use of a docking/air lock intertank door pallet.

General Concluding Remarks

It can be appreciated by those skilled in the art that access door pallets of the present invention are susceptible of a wide range of variations, adaptations and modifications following upon the teachings herein. All such adaptations, variations and modifications are deemed to fall within the scope of the invention. Equivalent access door pallets can be designed following the teachings herein, to perform a variety of useful functions and expand and alter the utility of an external tank and to provide for mounting devices internally and externally thereon, eject devices therefrom and facilitate access and use thereof, all within the scope of the appended claims.

I claim:

1. An access door pallet for an external tank of a shuttle transportation system wherein said tank comprises one or more access openings having removable access doors which can form operational closure of said access openings and which can be opened to permit entry through said opening into said tank before launch, wherein said access door pallet is an aft manhole cover pallet comprising mounting means for mounting said pallet in place of an access door such that said pallet can form operational closure of said access opening, wherein said pallet further comprises a mounting frame bolted to said pallet with mounting braces forming a truss supporting a pallet container comprising means for enclosing a payload, and wherein said pallet further comprises a main thruster, attitude control thrusters, and means for delivering fuel to said thrusters.

2. Access door pallet according to claim 1 wherein the thrusters are energized by fuel contained within the external tank.

3. Access door pallet according to claim 1 comprising an aft manhole cover pallet adapted to replace an aft manhole cover of a hydrogen tank or an oxygen tank, said pallet having fuel collection means comprising a lance in the form of a tube having an open extending inwardly into said tank a sufficient distance to extend beyond the level of any coalesced liquid in said tank after the external tank is separated from the orbiter, said fuel collection means having baffle means to prevent fuel loss through said lance and having coupling means to couple said lance to a fuel line connecting said fuel collection means to a thruster.

* * * * *